(12) United States Patent
Park et al.

(10) Patent No.: US 11,949,126 B2
(45) Date of Patent: Apr. 2, 2024

(54) NON-WELDING TYPE BATTERY MODULE AND BATTERY MODULE ASSEMBLY USING SAME

(71) Applicant: E-TESS CO., LTD., Bucheon-si (KR)

(72) Inventors: Sunwoo Park, Incheon (KR); Sooho Kang, Seoul (KR)

(73) Assignee: E-TESS CO., LTD., Bucheon-si (KR)

( * ) Notice: Subject to any disclaimer, the term of this patent is extended or adjusted under 35 U.S.C. 154(b) by 647 days.

(21) Appl. No.: 17/263,459

(22) PCT Filed: Jul. 1, 2019

(86) PCT No.: PCT/KR2019/007937
§ 371 (c)(1),
(2) Date: Jan. 26, 2021

(87) PCT Pub. No.: WO2020/027447
PCT Pub. Date: Feb. 6, 2020

(65) Prior Publication Data
US 2021/0151835 A1 May 20, 2021

(30) Foreign Application Priority Data
Aug. 1, 2018 (KR) .................. 10-2018-0089945

(51) Int. Cl.
*H01M 50/517* (2021.01)
*H01M 50/213* (2021.01)
*H01M 50/505* (2021.01)

(52) U.S. Cl.
CPC ....... *H01M 50/517* (2021.01); *H01M 50/213* (2021.01); *H01M 50/505* (2021.01)

(58) Field of Classification Search
CPC ............. H01M 50/517; H01M 50/213; H01M 50/505; H01M 50/289; H01M 50/107; H01M 50/502; H01M 50/20; Y02E 60/10
See application file for complete search history.

(56) References Cited

U.S. PATENT DOCUMENTS

| 2008/0002328 A1 | 1/2008 | Allain et al. |
| 2015/0249278 A1* | 9/2015 | Park ................. H01M 50/264 |
| | | 429/82 |
| 2017/0346050 A1* | 11/2017 | Morioka ........... H01M 50/3425 |

FOREIGN PATENT DOCUMENTS

| CN | 204793003 U | 11/2015 |
| CN | 107719139 A | 2/2018 |

(Continued)

*Primary Examiner* — Daniel S Gatewood
(74) *Attorney, Agent, or Firm* — Bridgeway IP Law Group, PLLC; Sang Ho Lee; Hyun Woo Shin

(57) ABSTRACT

Provided is a non-welding type battery module and a battery module assembly using same and, more particularly, to a non-welding type battery module capable of arranging and configuring, without welding, a plurality of battery cells in an assembly manner, and capable of easily arranging and configuring the plurality of battery cells in multiple layers and rows; and a battery module assembly using the battery module. The non-welding type battery module includes: a plurality of battery cells; an upper base plate disposed on an upper portion of the battery cells; a lower base plate disposed on a lower portion of the battery cells; a module fixing member coupled between the upper base plate and the lower base plate; a bus bar member seated on the upper base plate and the lower base plate and electrically connected to upper and lower electrode portions of the battery cells; and a battery cell support member disposed between the upper base plate and the lower base plate for positioning the plurality of battery cells in place.

10 Claims, 14 Drawing Sheets

(56) References Cited

FOREIGN PATENT DOCUMENTS

| | | | |
|---|---|---|---|
| JP | 2017-212065 A | | 11/2017 |
| KR | 10-2007-0091277 A | | 9/2007 |
| KR | 10-2015-0102632 A | | 9/2015 |
| KR | 10-2015-0121519 A | | 10/2015 |
| KR | 10-2015-0132903 A | | 11/2015 |
| KR | 20150132903 A | * | 11/2015 |
| KR | 10-2016-0127980 A | | 11/2016 |

* cited by examiner

NON-WELDING TYPE BATTERY MODULE AND BATTERY MODULE ASSEMBLY USING SAME

TECHNICAL FIELD

The present invention relates to a non-welding type battery module and a battery module assembly using the same, and more particularly, to a non-welding type battery module capable of arranging and configuring a plurality of battery cells in an assembly manner without welding and capable of easily arranging and configuring the plurality of battery cells in multiple layers and rows and a battery module assembly using the same.

BACKGROUND ART

In general, devices requiring energy for driving, such as mobile devices such as automobiles and motorcycles, industrial facilities, various mechanical devices, and the like mainly used fossil energy such as oil and coal, but have recently been replaced by a method using electricity as an energy source due to the depletion of fossil energy or environmental pollution.

For example, various mobile devices such as an electric vehicle, an electric scooter, an electric bicycle, a golf cart, and the like are equipped with a rechargeable battery module to supply power used as an energy source. As a prior art related to the rechargeable battery module, a battery module and a battery pack for a secondary battery disclosed in Korean Patent Publication No. 10-2015-0121519 have been proposed as shown in FIG. 1.

The above-described battery module 100 for a secondary battery is configured by including a plurality of battery cells 110, a pair of external terminals 130 connected to electrodes of each of the battery cells 110, and a plurality of bus bars 120*a* and 120*b* welded to the external terminals 130 to electrically connect the battery cells 110 to each other.

The conventional battery module 100 for a secondary battery is manufactured in a manner in which the external terminal 130 is welded to each of the battery cells 110 and the bus bars 120*a* and 120*b* are welded to the external terminal 130 as described above and thus has limitations that cause various problems as follows.

First, the conventional battery module 100 for a secondary battery has a structure depending on a welding method in assembling and electrically connecting battery cells and thus has a disadvantage in that productivity is low and manufacturing cost is remarkably increased due to an increase in manufacturing labor costs and an increase in manufacturing time.

In addition, since the conventional battery module 100 for a secondary battery depends on the welding method in assembling and electrically connecting battery cells, there is a disadvantage in that welding equipment and a skilled worker are required, a great deal of electric energy is required during welding, and there is always a risk of safety accidents such as burns and fires during welding.

In particular, since the conventional battery module 100 for a secondary battery depends on the welding method in assembling and electrically connecting battery cells, damage to the battery cells may be caused by a heat load applied during welding, and when a welder's skill level is low, there is a problem in that not only are defective products mass-produced, but also the replacement or reuse of the battery cell is not possible.

Further, since the conventional battery module 100 for a secondary battery is assembled using a welding method, the process of arranging the battery cells 110 in multiple layers and rows is difficult and takes a lot of time, and thus there is a limitation of lack of scalability.

DISCLOSURE

Technical Problem

The present invention is directed to providing a non-welding type battery module and a battery module assembly using the same that are capable of stably maintaining an electrical connection relationship without welding and allowing a plurality of battery cells to be arranged and configured simply and quickly in an assembly manner.

Also, the present invention is directed to providing a non-welding type battery module and a battery module assembly using the same, allowing a plurality of battery cells to be easily arranged and configured simply and quickly in multiple layers and rows.

Technical Solution

One aspect of the present invention provides a non-welding type battery module including a plurality of battery cells, an upper base plate disposed on an upper portion of the battery cell, a lower base plate disposed on a lower portion of the battery cell, a module fixing member coupled between the upper base plate and the lower base plate, a bus bar member seated on the upper base plate and the lower base plate and electrically connected to upper and lower electrode portions of the battery cells, and a battery cell support member disposed between the upper base plate and the lower base plate to position the plurality of battery cells in place.

Each of the upper base plate and the lower base plate may include a plate-shaped body on which at least one coupling portion having a coupling hole perforated therein is formed, and the module fixing member may be configured as a fastening member fastened to the coupling portion of each of the upper base plate and the lower base plate.

The coupling portion may include a plurality of coupling protrusions each protruding from a corner portion of the plate-shaped body, and the fastening member may include a fastening rod, which has nuts embedded in an upper portion and a lower portion of an inner hole, and bolts fastened to the nuts.

At least one tool seating surface may be formed on an outer surface of the fastening rod.

The battery cell support member may include a plate-shaped cell support plate, in which a cell seating hole perforated to allow the battery cell to be inserted therethrough and a support hole perforated to allow the module fixing member to be inserted therethrough are formed.

The bus bar member may include a plate-shaped conductive plate on which an electrode contact portion, to which the battery cell is electrically connected, and a connection portion, which is formed for electrical connection with the outside and has a terminal hole perforated therein, are formed.

The electrode contact portion may include upper deformation protrusions protruding upward from the conductive plate and lower deformation protrusions protruding downward from the conductive plate.

The battery cell support member may include a plate-shaped cell support plate, in which a cell seating hole perforated to allow the battery cell to be inserted therethrough and a support hole perforated to allow the module fixing member to be inserted therethrough are formed, and a connection protrusion which is formed to be located below the connection portion and in which a module connection hole is perforated, and the connection protrusion may be formed to have a thickness less than a thickness of the cell support plate so that an insertion space is formed between the connection portion and the connection protrusion.

Each of the upper base plate and the lower base plate may include a plate-shaped body on which at least one coupling portion having a coupling hole perforated therein and a close contact protrusion protruding to a position corresponding to the electrode contact portion are formed.

The battery cell support member may include a plate-shaped cell support plate, in which a cell seating hole perforated to allow the battery cell to be inserted therethrough, a support hole perforated to allow the module fixing member to be inserted therethrough, and an auxiliary coupling hole perforated for coupling between the upper base plate and the lower base plate or coupling between the battery cell support member and the upper and lower base plates are formed, and each of the upper base plate and the lower base plate may include a plate-shaped body on which at least one coupling portion having a coupling hole perforated therein and an auxiliary coupling hole perforated therein to correspond to the auxiliary coupling hole are formed.

In the non-welding type battery module according to the present invention, the battery cells may be supported by the battery cell support member, which is additionally disposed to form multiple layers in a longitudinal direction, and may be electrically connected through the bus bar member disposed in contact with the battery cell support member.

Another aspect of the present invention provides a battery module assembly using a non-welding type battery module, the assembly including the non-welding type battery module, a plural of which are disposed to be in contact with each other in a transverse direction, and a module coupling member coupled between the adjacent non-welding type battery modules.

The module coupling member may be formed of a conductive member or in a structure in which a conductive layer is formed on a base layer to be electrically connected to the bus bar member.

Still another aspect of the present invention provides a battery module assembly using a non-welding type battery module, the assembly including the non-welding type battery module, a plurality of which are disposed to be in contact with each other in a transverse direction, and a module coupling member coupled between the adjacent non-welding type battery modules, wherein the module coupling member includes a module coupling plate, which is formed of an insulating material, is inserted into a space between the upper base plate and the bus bar member and a space between the lower base plate and the bus bar member, and has a coupling hole formed therein, and a module conductive member that is seated on a surface of the module coupling plate, is electrically connected to the bus bar member, and has a terminal hole perforated therein.

Advantageous Effects

In a non-welding type battery module and a battery module assembly using the same according to the present invention, battery cells can be electrically connected through mechanical assembly without welding so that the battery cells can be assembled concisely, simply, and quickly during a manufacturing process, and accordingly, manufacturing time can be shortened to improve productivity, and manufacturing labor costs or the like can be reduced to reduce manufacturing cost, and also, during assembly, a skilled worker is not required and electrical energy can be saved, and safety accidents caused by welding and disasters such as fire can be prevented.

In a non-welding type battery module and a battery module assembly using the same according to the present invention, since battery cells are not assembled by welding, damage to the battery cells due to a heat load can be prevented in advance, and accordingly, the occurrence of defective products due to welding failure can be prevented in advance, and also, the battery cells can be easily replaced and can be reused.

MODES OF THE INVENTION

Figure 1:
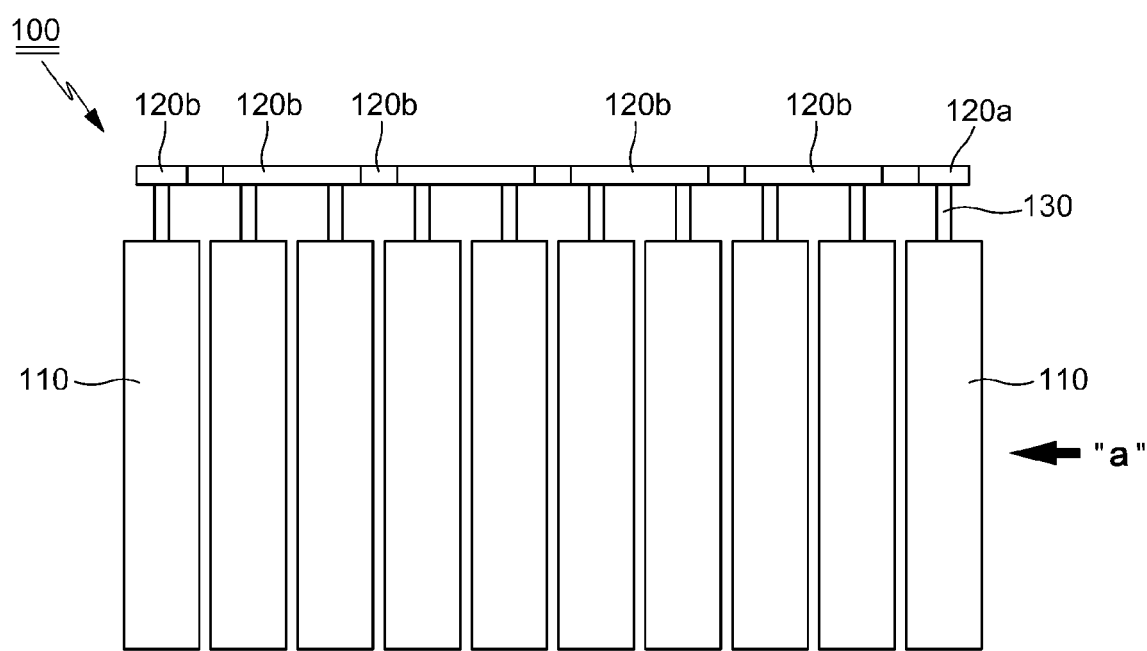
FIG. 1 is a view for describing a conventional battery module.

Hereinafter, exemplary embodiments of the present invention will be described in detail with reference to FIGS. 2 to 13, and in FIGS. 2 to 13, like reference numerals represent like elements. Meanwhile, in each drawing, actions and effects of a configuration that can be easily understood by those skilled in the art from general technology are briefly illustrated, and detailed descriptions thereof are simplified or omitted. Parts related to the present invention are mainly illustrated.

Figure 2:
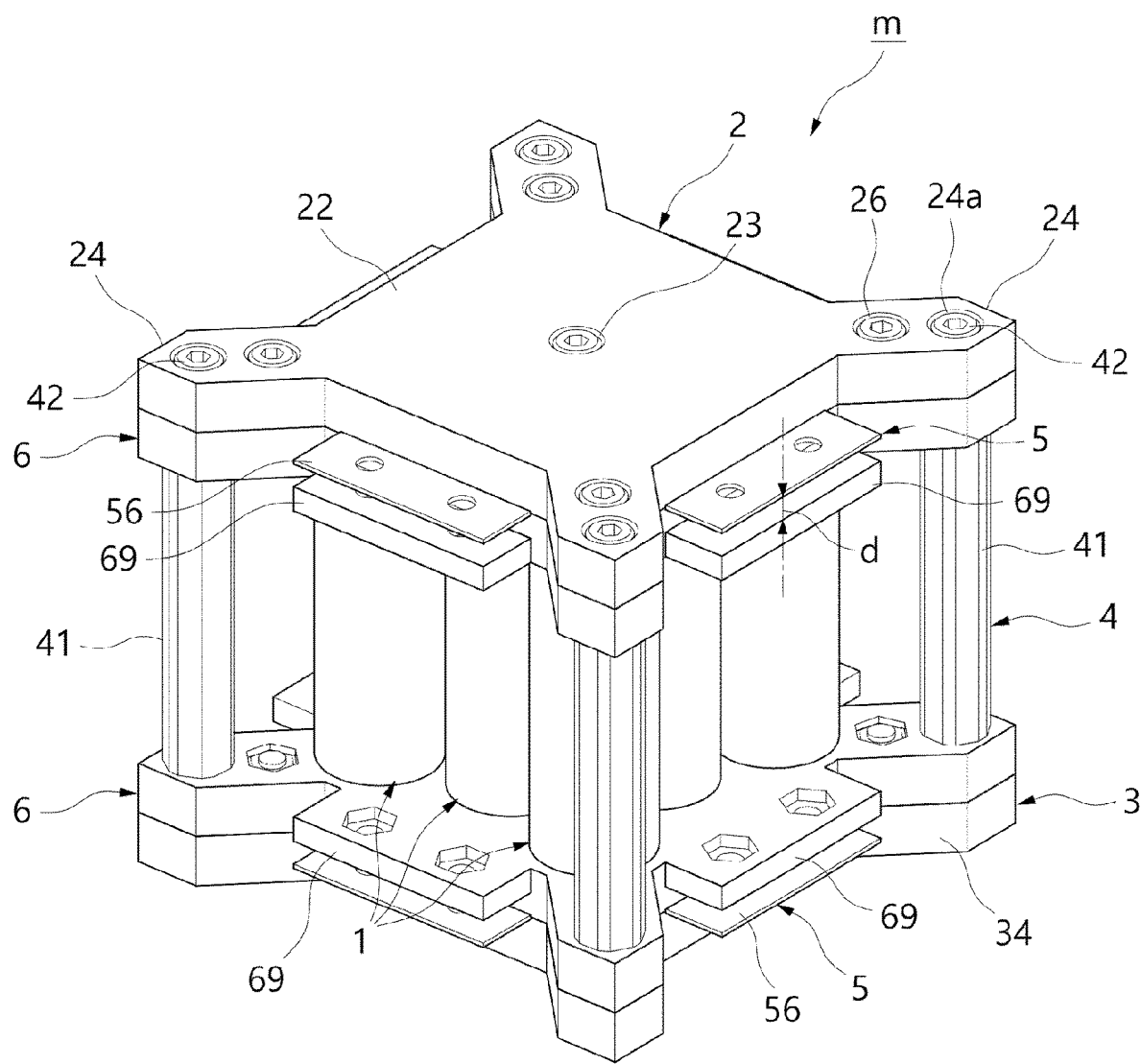
FIG. 2 is a perspective view illustrating an assembled state of a non-welding type battery module according to a first embodiment of the present invention.
Figure 3:
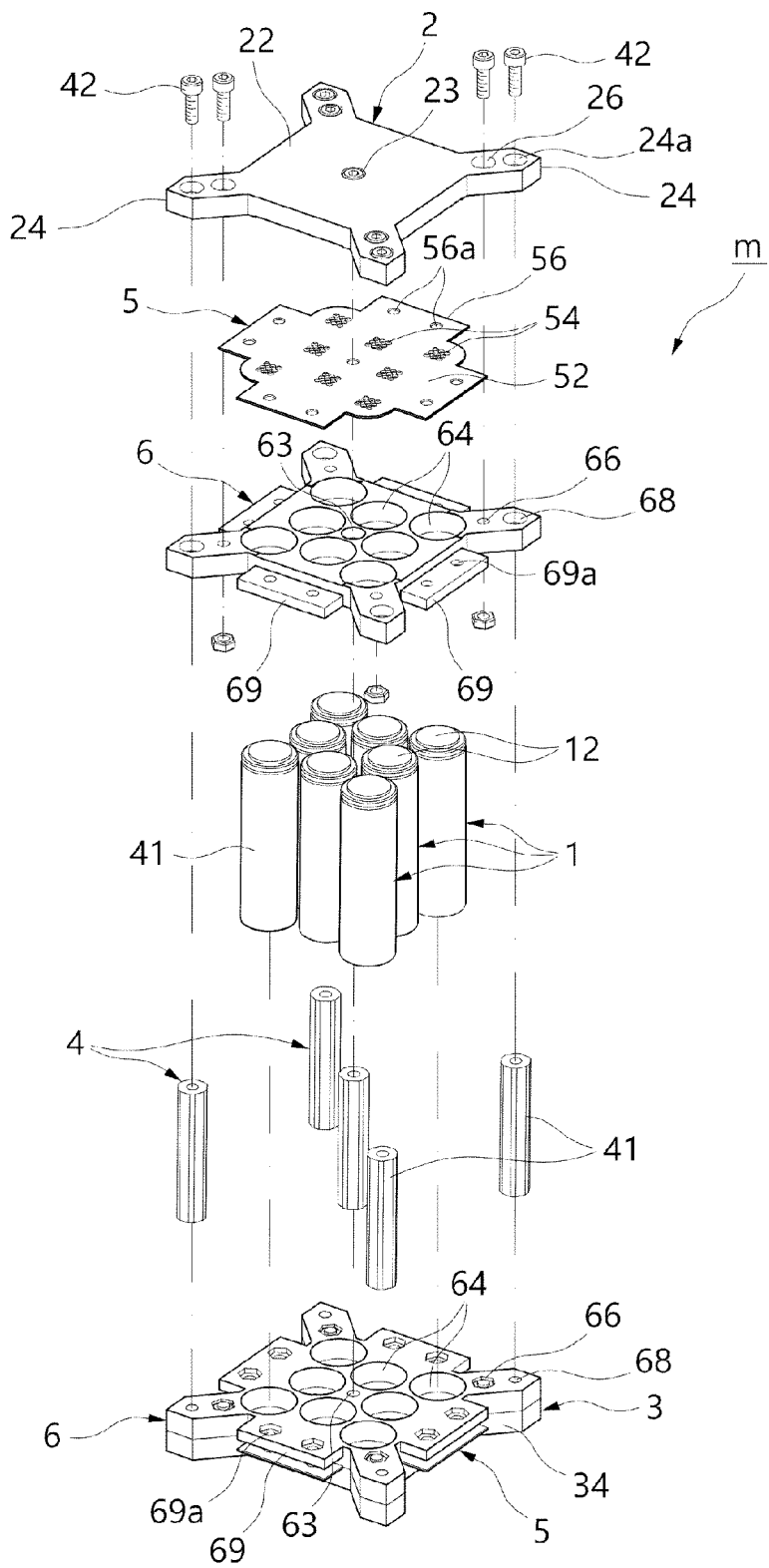
FIG. 3 is an exploded perspective view of the non-welding type battery module according to the first embodiment of the present invention.

FIG. 2 is a perspective view illustrating an assembled state of a non-welding type battery module according to a first embodiment of the present invention, and FIG. 3 is an exploded perspective view of the non-welding type battery module according to the first embodiment of the present invention.

Referring to FIGS. 2 and 3, a non-welding type battery module m according to the first embodiment of the present invention is configured by arranging a plurality of battery cells in an assembly manner without welding and includes a battery cell 1, an upper base plate 2, a lower base plate 3, a module fixing member 4, a bus bar member 5, and a battery cell support member 6.

The battery cell 1 is a secondary battery in which electrical energy is stored, and any secondary battery capable of storing electrical energy, such as a lithium-ion battery, a lithium-ion polymer battery, or the like may be applied as the battery cell 1 without any particular limitation.

In addition, as shown in FIG. 3, the battery cell 1 that is formed in a cylindrical shape and manufactured in a shape in which electrode portions 12 are exposed to upper and lower sides of the battery cell 1 is applied, but the present invention is not limited thereto, and the battery cell 1 formed in a hexahedral shape such as a square cylindrical shape or a square plate shape may be applied.

Figure 4:
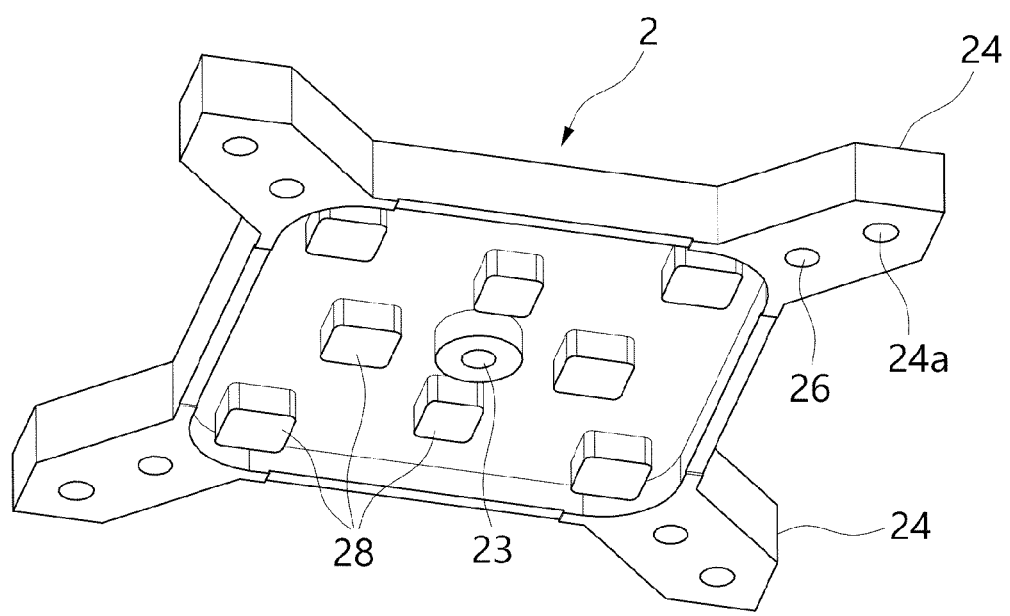
FIG. 4 is a perspective view for describing an upper base plate and a lower base plate of the non-welding type battery module according to the first embodiment of the present invention.

FIG. 4 is a perspective view for describing the upper base plate and the lower base plate of the non-welding type battery module according to the first embodiment of the present invention.

Referring to FIG. 4, the upper base plate 2 is an element disposed on an upper portion of the battery cell and is formed in a structure in which a coupling portion 24 is formed on a plate-shaped body 22 having a substantially quadrangular shape. In addition, the upper base plate 2 may be made of an insulating material such as plastic or the like in consideration of electrical insulation.

Here, the coupling portion 24 may be configured as one or more coupling portions depending on the size, arrangement quantity, or the like of the battery cells, and in the present embodiment, the coupling portion 24 may be configured as a plurality of coupling protrusions each protruding from a corner portion of the plate-shaped body 22.

In addition, in the coupling portion 24, a coupling hole 24a, which is perforated to allow the coupling portion 24 to be coupled to the module fixing member 4, and an auxiliary coupling hole 26, which is perforated to correspond to auxiliary coupling holes 66 and 36 formed on the battery cell support member 6 and the lower base plate 3, are formed.

In addition, in the upper base plate 2, a close contact protrusion 28 protruding from a bottom surface of the upper base plate 2 at a position corresponding to an electrode contact portion 54 of the bus bar member 5, which will be described below, is formed. In an assembled state, the close contact protrusion 28 presses the electrode contact portion 54 and thus functions to firmly maintain an electrical connection state between the electrode portion 12 of the battery cell 1 and an upper deformation protrusion 54a and a lower deformation protrusion 54b of the electrode contact portion 54.

In addition, the upper base plate 2 has a center coupling hole 23 perforated at a center thereof. The center coupling hole 23 is a hole through which a bolt is inserted and configured to install the module fixing member 4 in center coupling holes 33, 54, and 63 respectively formed in the lower base plate 3, the bus bar member 5, and the battery cell support member 6 corresponding to the same vertical line. As described above, when the module fixing member 4 is additionally installed between the upper base plate 2 and the lower base plate 3, there is an advantage that a firmer fixed state may be maintained.

Meanwhile, the lower base plate 3 is an element disposed on a lower portion of the battery cell 1 and is formed in the same structure as the upper base plate 2 described above, and thus a detailed description of the detailed configuration will be omitted.

Figure 5A:
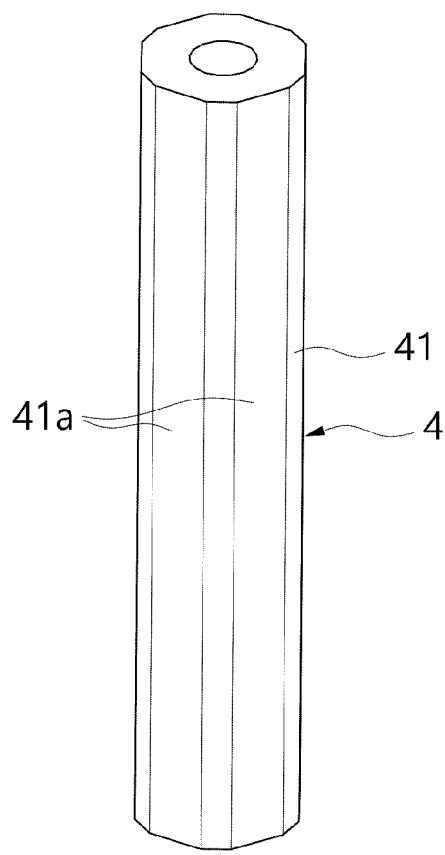
FIG. 5A is a perspective view for describing a module fixing member of the non-welding type battery module according to the first embodiment of the present invention.
Figure 5B:
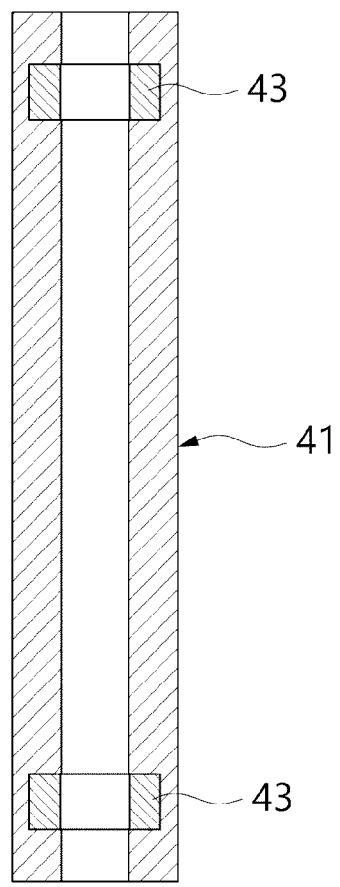
FIG. 5B is a cross-sectional view for describing the module fixing member of the non-welding type battery module according to the first embodiment of the present invention.

FIG. 5A is a perspective view for describing the module fixing member of the non-welding type battery module according to the first embodiment of the present invention, and FIG. 5B is a cross-sectional view for describing the module fixing member of the non-welding type battery module according to the first embodiment of the present invention.

Referring to FIGS. 5A and 5B, the module fixing member 4 is an element coupled between the upper base plate 2 and the lower base plate 3 and may be configured in various forms without any particular limitation as long as the upper base plate 2 and the lower base plate 3 can be firmly fixed to each other, but in the present embodiment, the module fixing member 4 is configured as a fastening member fastened to the coupling portion 24 of each of the upper base plate 2 and the lower base plate 3.

Here, the fastening member includes a fastening rod 41, in which nuts 43 are embedded in an upper portion and a lower portion of an inner hole, and bolts 42 that are fastened to the nuts 43.

The fastening rod 41 is formed in a structure in which at least one tool seating surface 41a is formed on an outer surface thereof to facilitate insertion of a tool such as a spanner during assembly. For example, the fastening rod 41 may be formed to have a cross-sectional shape of a rectangular or octagonal cross-sectional structure, but in the present embodiment, the fastening rod 41 is formed in a hexagonal cross-sectional structure having six tool seating surfaces 41a.

Figure 6:
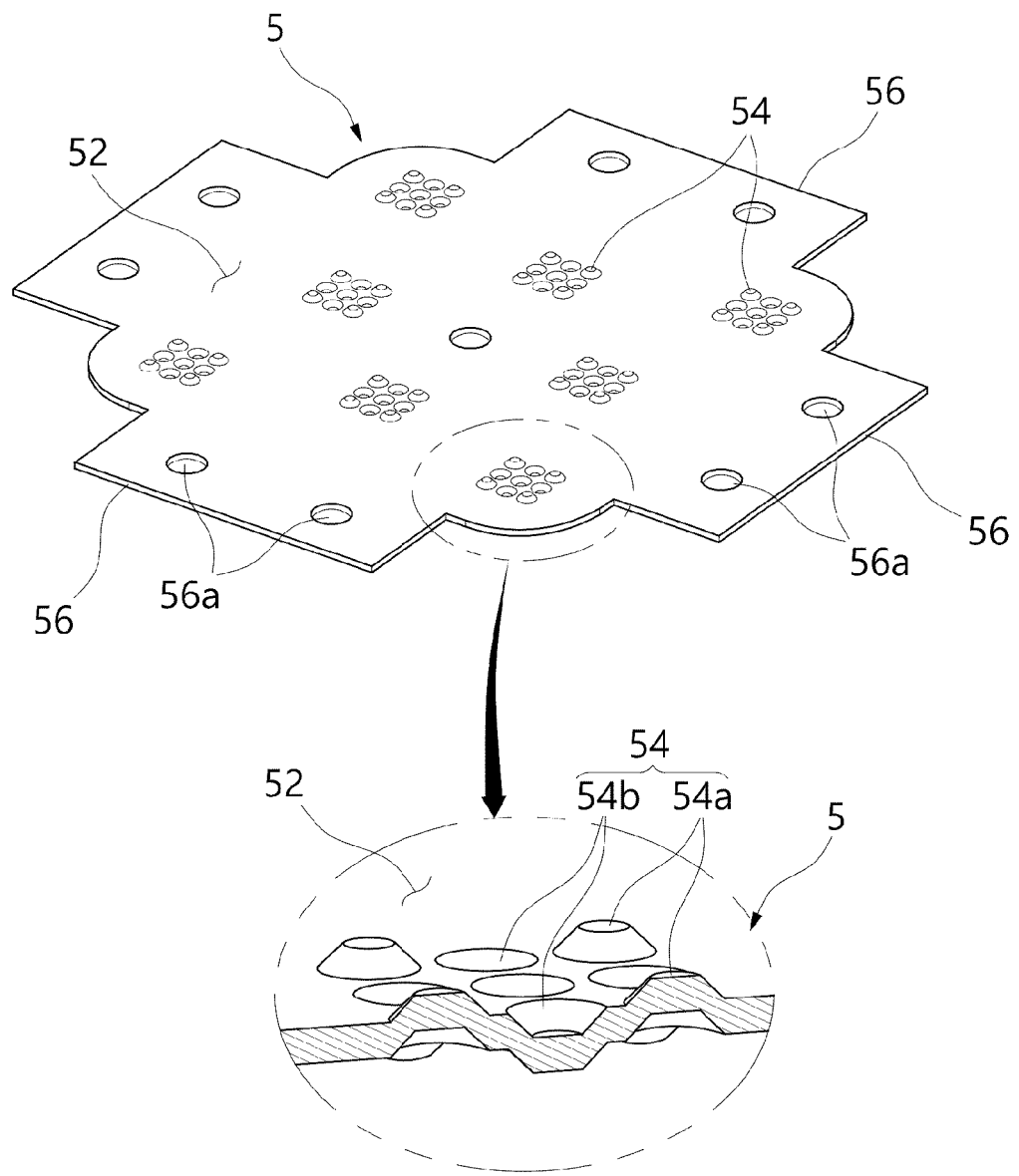
FIG. 6 is a perspective view for describing a bus bar member of the non-welding type battery module according to the first embodiment of the present invention.

FIG. 6 is a perspective view for describing the bus bar member of the non-welding type battery module according to the first embodiment of the present invention, and an enlarged part is illustrated by cutting a portion of the bus bar member.

Referring to FIG. 6, the bus bar member 5 is an element seated on the upper base plate 2 and the lower base plate 3 and electrically connected to upper and lower electrode portions of the battery cell 1 and has a structure in which the electrode contact portion 54 to which the battery cell 1 is electrically connected and a connection portion 56 formed for electrical connection with the outside and having a terminal hole 56a perforated therein are formed on a conductive plate 52 having a plate shape.

Here, the electrode contact portion 54 includes a plurality of upper deformation protrusions 54a protruding upward from the conductive plate 52, and a plurality of lower deformation protrusions 54*b* protruding downward from the conductive plate 52, and the upper deformation protrusions 54*a* and the lower deformation protrusions 54*b* are formed through a method of integrally extruding a conductive thin plate such as a copper plate by a pressing process.

In addition, when a clamping force of the module fixing member 4 is applied during the assembling process, the upper deformation protrusions 54*a* and the lower deformation protrusions 54*b* are brought into close contact with the electrode portion 12 of the battery cell 1 as the protruding portion is contracted and deformed, thereby firmly maintaining the electrical connection relationship without welding as in the related art.

In particular, the bus bar member 5 has a structure in which the connection portions 56 are provided in all directions on the plate-shaped conductive plate 52, has excellent expandability in a vertical direction and a horizontal direction by adjusting the installed quantity, and has an advantage of being able to realize various functions by providing excellent expandability between battery modules, which will be described below (see FIGS. 10 to 13).

Figure 7:
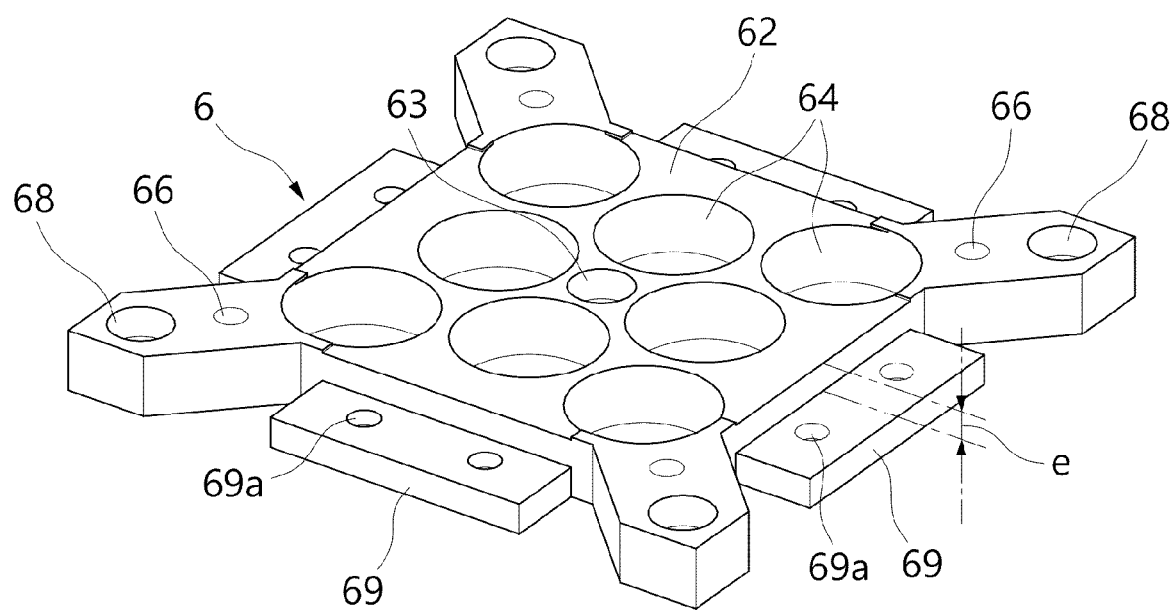
FIG. 7 is a perspective view for describing a battery cell support member of the non-welding type battery module according to the first embodiment of the present invention.

FIG. 7 is a perspective view for describing the battery cell support member of the non-welding type battery module according to the first embodiment of the present invention.

Referring to FIG. 7, the battery cell support member 6 is an element disposed between the upper base plate 2 and the lower base plate 3 to position the plurality of battery cells 1 in place, and cell seating holes 64, which are each perforated to allow the battery cell 1 to be inserted therethrough, and support holes 68, which are each perforated to allow the module fixing member 4 to be inserted therethrough, are formed in a cell support plate 62 which is formed of an insulating material such as plastic and has a square plate shape. Here, the support hole 68 is formed in a protrusion which protrudes from a corner portion of the cell support plate 62 in a shape corresponding to the coupling portions 24 and 34 of the upper base plate 2 and the lower base plate 3.

In addition, the battery cell support member 6 is formed to be located below the connection portion 56 of the bus bar member 5, and connection protrusions 69 having module connection holes 69*a* perforated therein are formed on upper, lower, left, and right side surfaces of the cell support plate 62. Here, each of the connection protrusions 69 is formed to have a thickness less than that of the cell support plate 62 so that an insertion space d (see FIG. 2) is formed between the connection protrusion 69 and the connection portion 56 and protrudes from a lower end of the battery cell support member 6 so that a stepped portion e is formed between the connection protrusion 69 and an upper surface of the battery cell support member 6.

In addition, an auxiliary coupling hole 66 perforated for coupling between the upper base plate 2 and the lower base plate 3 or coupling between the battery cell support member 6 and the upper and lower base plates 2 and 3 as illustrated in a second embodiment (see FIGS. 8 and 9) to be described below is formed in the battery cell support member 6.

Hereinafter, actions of the non-welding type battery module according to the first embodiment of the present invention will be briefly described.

When one assembly method is briefly described with reference to FIGS. 2 and 3, the bus bar member 5 and the battery cell support member 6 are installed on the lower base plate 3 in a method of sequentially placing the battery cell support member 6 and the bus bar member 5 on an upper surface of the lower base plate 3 and fastening bolts to the auxiliary coupling holes 66 and 36 of the battery cell support member 6 and the lower base plate 3, and in the same and a similar manner, the bus bar member 5 and the battery cell support member 6 are sequentially disposed on and fixed to a lower side of the upper base plate 2.

In such a state, the fastening rod 41 is properly positioned in a coupling hole of the coupling portion 34, which is located at each corner portion of the lower base plate 3, and the bolt 42 is fastened for fixing.

Subsequently, lower side portions of the plurality of battery cells 1 are sequentially inserted into the cell seating holes 64 of the battery cell support member 6 fixed to the upper surface of the lower base plate 3 and properly positioned, and upper side portions of the battery cells 1 are assembled to be inserted into the cell seating holes 64 of the battery cell support member 6 fixed to a lower surface of the upper base plate 2.

In such a state, the fastening rod 41 is inserted into the support hole 68 of the battery cell support member 6 located on the upper surface of the lower base plate 3, and the bolt 42 is fastened to the coupling hole (not shown) of the coupling portion 34 located at each corner portion of the lower base plate 3 for fixing.

Thereafter, when the fastening rod 41 is inserted into the support hole 68 of the battery cell support member 6 located at the lower surface of the upper base plate 2, and the bolt 42 is inserted through the coupling hole 24*a* of the coupling portion 24 located at each corner portion of the upper base plate 2 to apply a clamping force, the upper base plate 2 is moved downward by the clamping force, and subsequently, the lower base plate 3 fixed through the fastening rod 41 is pulled upward by interaction. Subsequently, a pressing force is applied to the electrode contact portion 54 of the bus bar member 5 by the close contact protrusion 28 protruding from the lower surface of the upper base plate 2, and thus the upper deformation protrusion 54*a* and the lower deformation protrusion 54*b* are deformed. At this point, the lower deformation protrusion 54*b* is deformed while pressing a surface of the upper electrode portion 12 of the battery cell 1 so that an electrical coupling relationship is firmly secured.

In addition, since the pressing force is applied to the electrode contact portion 54 of the bus bar member 5 coupled to the lower base plate 3 by the interaction, the upper deformation protrusion 54*a* is deformed while pressing a surface of the lower electrode portion of the battery cell 1 so that the electrical coupling relationship is firmly maintained.

As described above, in the non-welding type battery module according to the first embodiment of the present invention, since the electrical connection and mechanical assembly process of the battery cells 1 are made simultaneously through the method of arranging the plurality of battery cells 1 between the upper base plate 2 and the lower base plate 3 and installing the module fixing member 4, the manufacturing process may be performed concisely, simply, and quickly, so that productivity is expected to be improved by shortening manufacturing time and manufacturing cost is expected to be reduced by reducing manufacturing labor costs or the like.

In addition, since the electrical connection relationship may be firmly maintained using a method of pressing the deformable electrode contact portion 54 to make pressure contact instead of electrically connecting the battery cells by welding as in the related art, a skilled worker is not required and electrical energy required during welding is unnecessary so that safety accidents caused by welding and disasters such as fire may be prevented in advance.

In addition, since the non-welding type battery module according to the first embodiment of the present invention is not assembled by welding, damage to the battery cells due to a heat load may be prevented in advance, and the occurrence of defective products due to welding failure may be prevented, and also, the battery cell may be easily replaced and may be reused.

Hereinafter, another embodiment of the present invention will be described, but for elements similar to the elements illustrated in the above-described first embodiment, detailed descriptions will be omitted, and elements having differences will be mainly described. In addition, in the following another embodiment of the present invention, the elements illustrated in the first embodiment or the elements shown in a different embodiment may be selectively applied as long as they can be employed, and thus, a detailed description or drawing thereof will be omitted.

Figure 8:
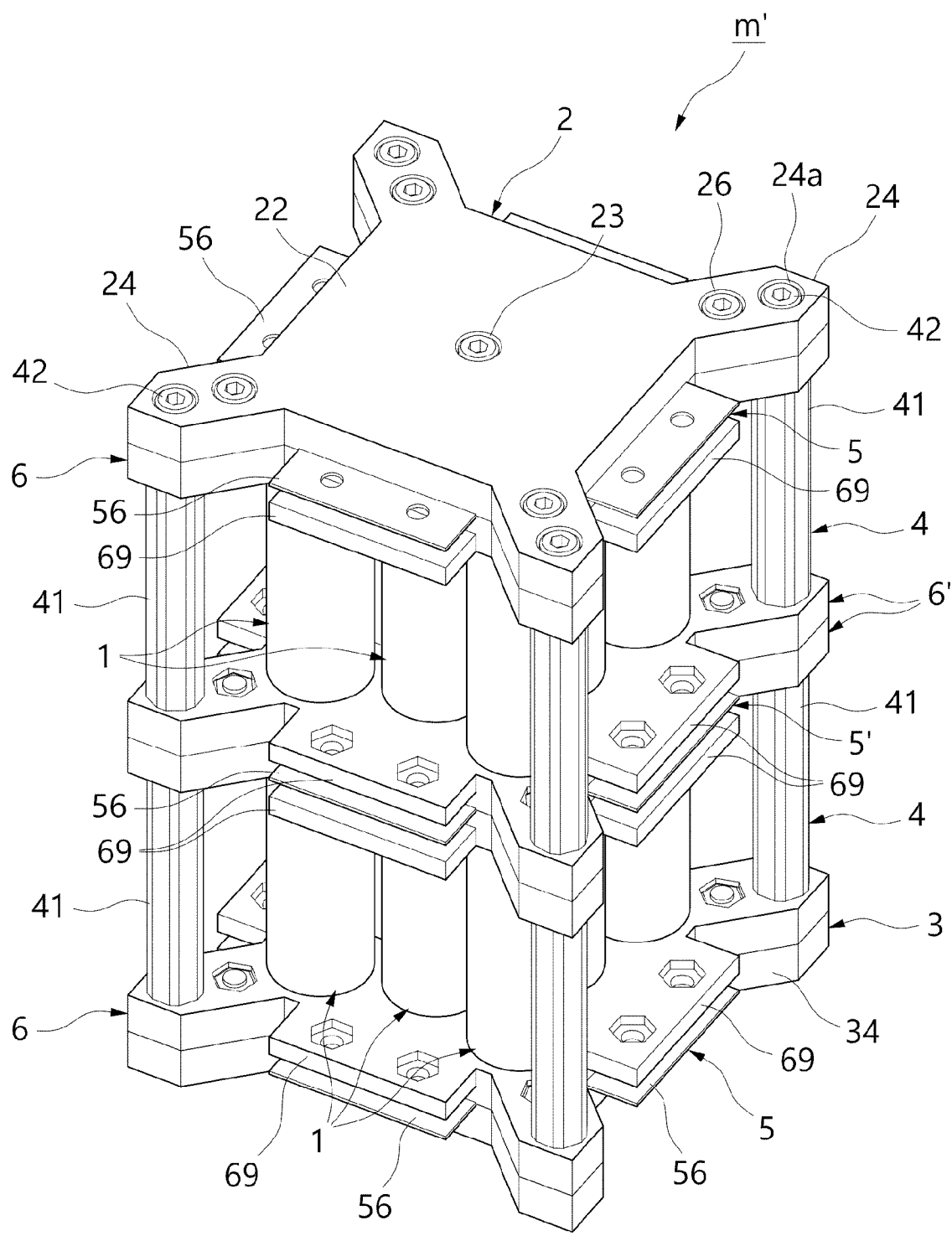
FIG. 8 is a perspective view of a non-welding type battery module according to a second embodiment of the present invention.
Figure 9:
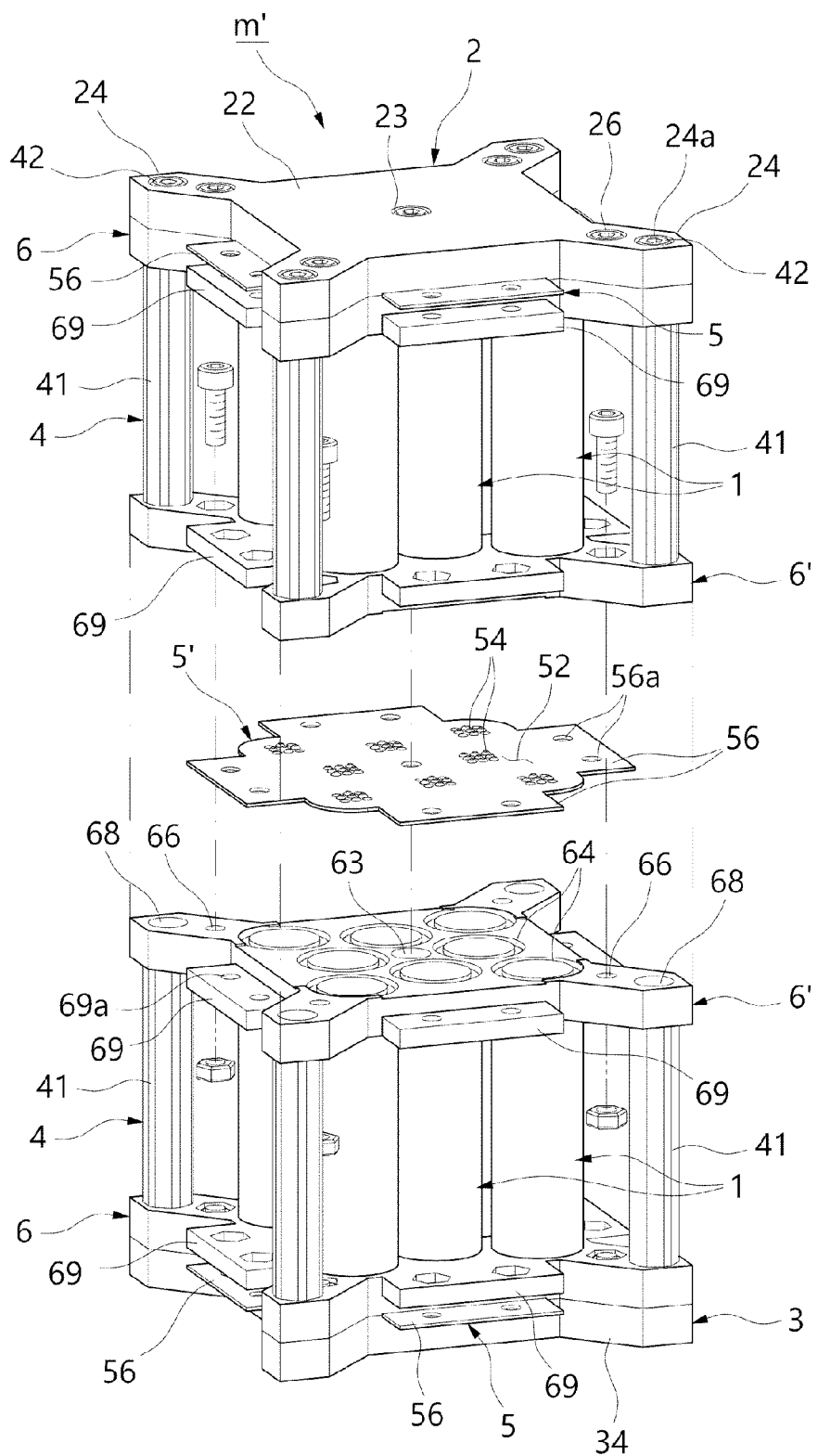
FIG. 9 is an exploded perspective view of the non-welding type battery module according to the second embodiment of the present invention.

FIG. 8 is a perspective view of a non-welding type battery module according to a second embodiment of the present invention, and FIG. 9 is an exploded perspective view of the non-welding type battery module according to the second embodiment of the present invention.

A non-welding type battery module m' according to the second embodiment of the present invention is configured as a structure including battery cells 1, an upper base plate 2, a lower base plate 3, a module fixing member 4, a bus bar member 5, and a battery cell support member 6, and the battery cells 1 are arranged to form multiple layers in a longitudinal direction.

For example, as shown in FIGS. 8 and 9, a plurality of battery cells 1 disposed at a lower side and a plurality of battery cells 1 disposed on an upper side are supported by the battery cell support member 6, which is additionally disposed, while being arranged in the longitudinal direction to be respectively located on the same vertical axis line, and are electrically connected through a bus bar member 5' disposed in contact with a battery cell support member 6' additionally disposed at a central portion in a height direction.

More specifically, the plurality of battery cells 1 disposed at the lower side and the plurality of battery cells disposed at the upper side are electrically connected to each other as one bus bar member 5' is interposed between two battery cell support members 6' disposed in the central portion of FIG. 8.

Meanwhile, although it is not described in detail by the attached drawings, the non-welding type battery module according to the second embodiment of the present invention may be substantially implemented in a structure in which the plurality of battery cells 1 are stacked in three or more layers, supported by the additional battery cell support member 6', and electrically connected by the bus bar member 5'.

In addition, although it is not described in detail by the attached drawings, the non-welding type battery module m' according to the second embodiment of the present invention may be configured as a structure, in which two bus bar members (not shown) are disposed between the battery cell support members 6' additionally disposed in the center portion, and a plate-shaped insulating member (not shown) is installed between the bus bar members so that the upper and lower battery cells are electrically insulated from each other.

Figure 10:
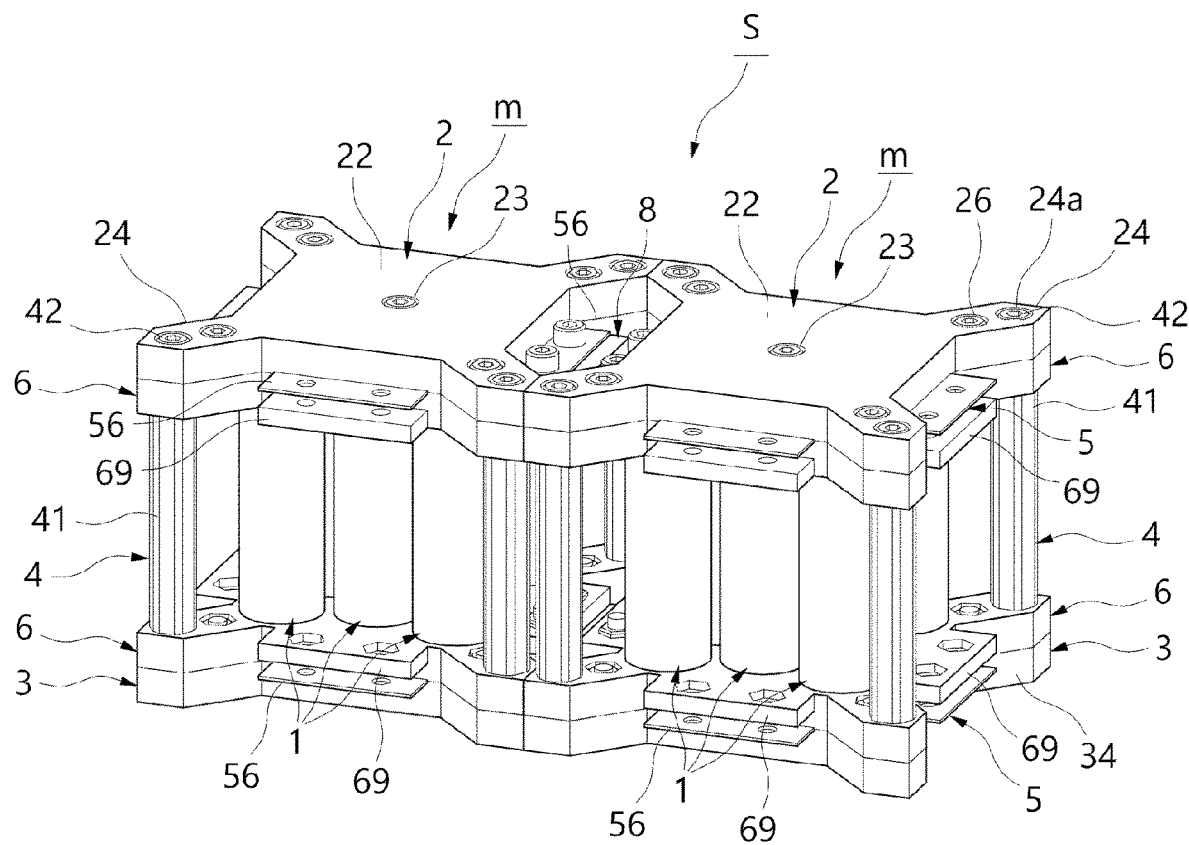
FIG. 10 is a perspective view for describing a battery module assembly using the non-welding type battery module according to the first embodiment of the present invention.
Figure 11:
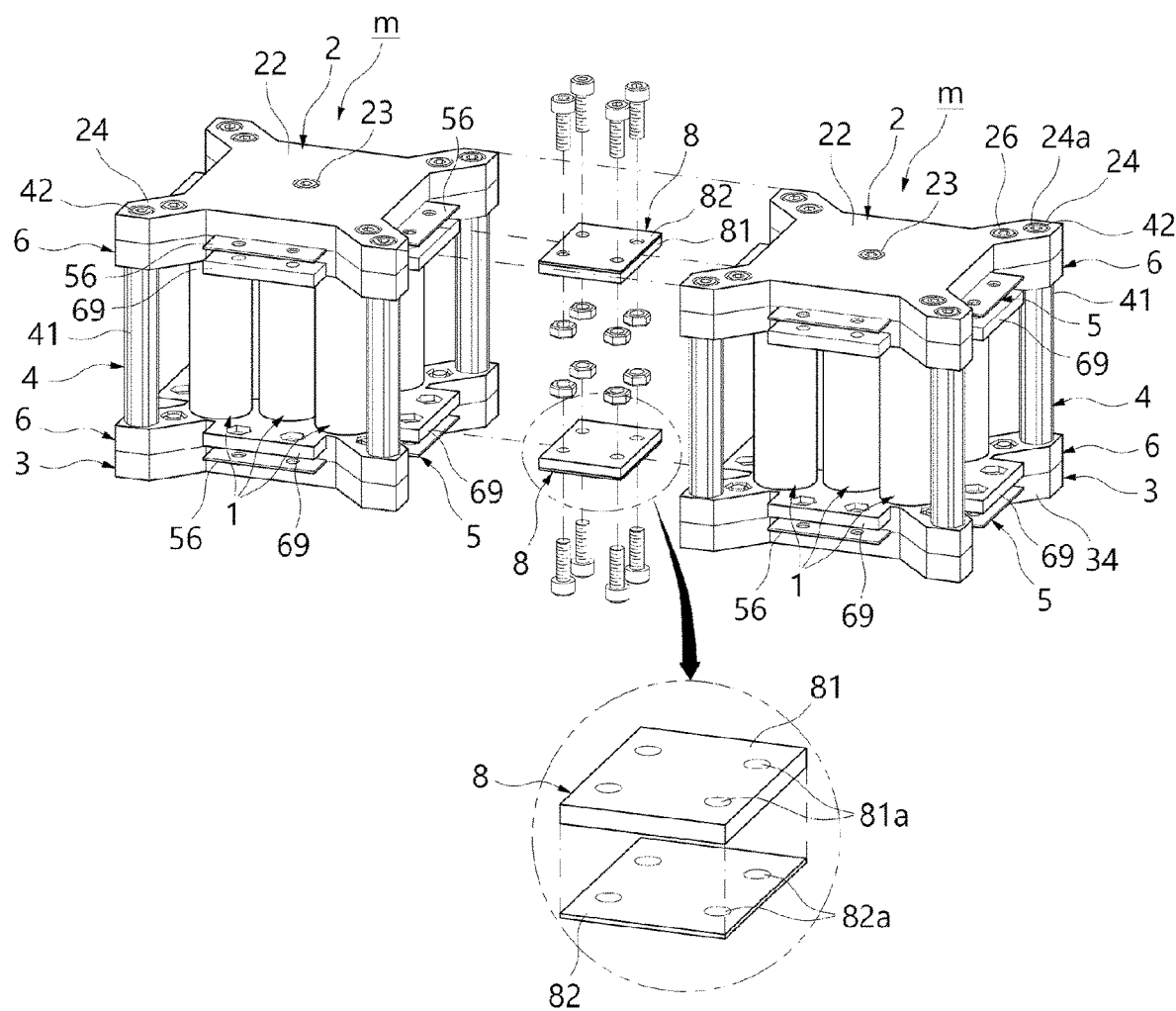
FIG. 11 is an exploded perspective view illustrating a disassembled state of the battery module assembly using the non-welding type battery module according to the first embodiment of the present invention.

FIG. 10 is a perspective view for describing a battery module assembly using the non-welding type battery module according to the first embodiment of the present invention, and FIG. 11 is an exploded perspective view illustrating a disassembled state of the battery module assembly using the non-welding type battery module according to the first embodiment of the present invention.

Referring to FIGS. 10 and 11, a battery module assembly s using the non-welding type battery module according to the first embodiment of the present invention may configure a large-capacity battery module assembly by arranging a plurality of non-welding type battery modules m illustrated in the above-described first embodiment so as to be in contact with each other in a transverse direction and coupling each other using a module coupling member 8 installed between adjacent non-welding type battery modules.

The module coupling member 8 is an element for electrically connecting both bus bar members 5 while mechanically assembling adjacent non-welding type battery modules m, and may be configured in various ways without any particular limitation. For example, the module coupling member 8 may be configured of only a conductive member or formed in a structure in which a conductive layer is formed on a base layer as long as it has a structure that allows electrical connection while maintaining a firmly fixed state between each other.

For example, as shown in FIG. 11, the module coupling member 8 includes a module coupling plate 81, which is inserted into an insertion space d, formed of an insulating material, and has a coupling hole 81a formed therein, and a module conductive member 82 that is seated on a surface of the module coupling plate 81, electrically connected to the bus bar member 5, and has a terminal hole 82a perforated therein.

Figure 12:
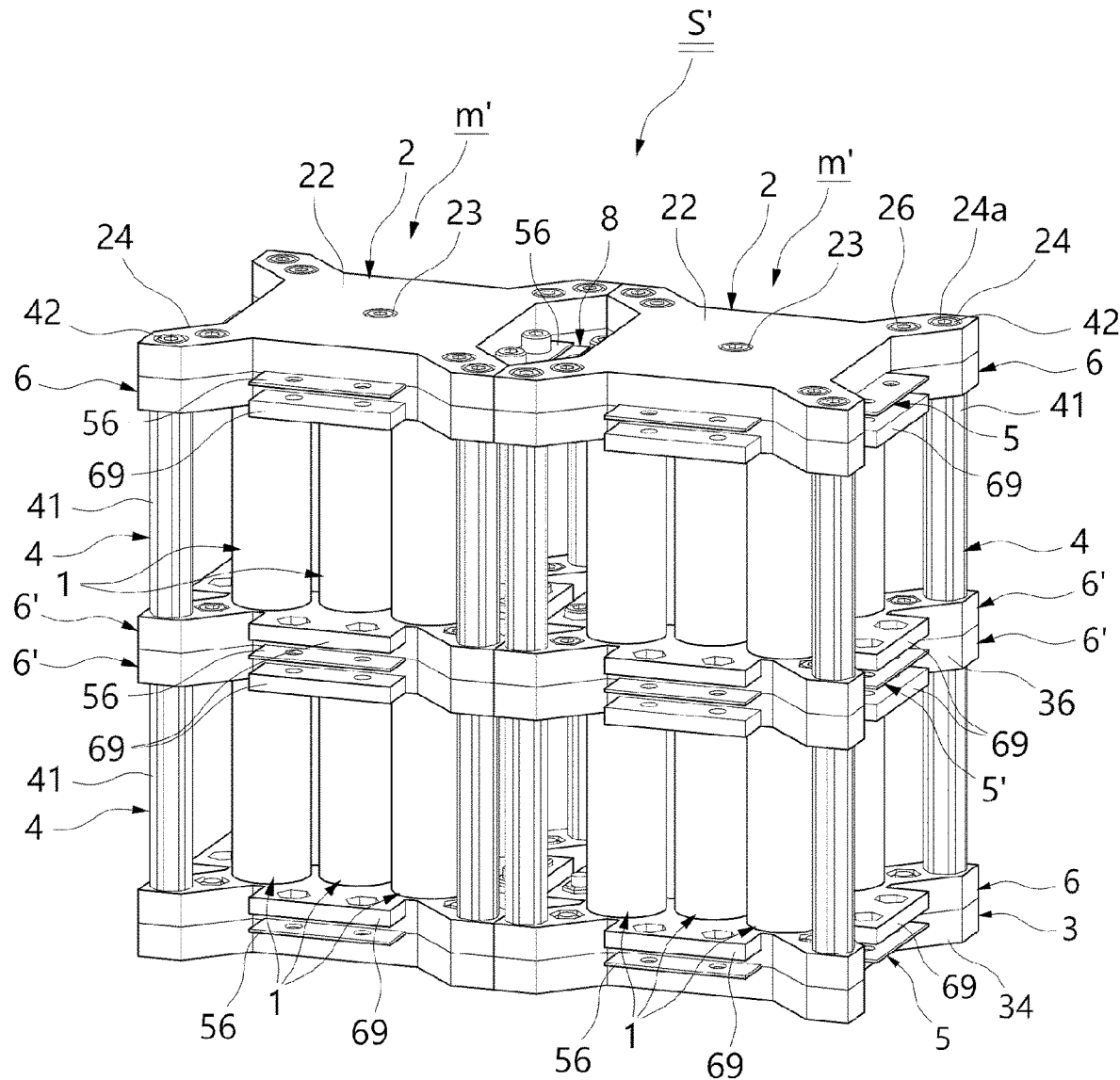
FIG. 12 is a perspective view for describing a battery module assembly using the non-welding type battery module according to the first embodiment of the present invention.
Figure 13:
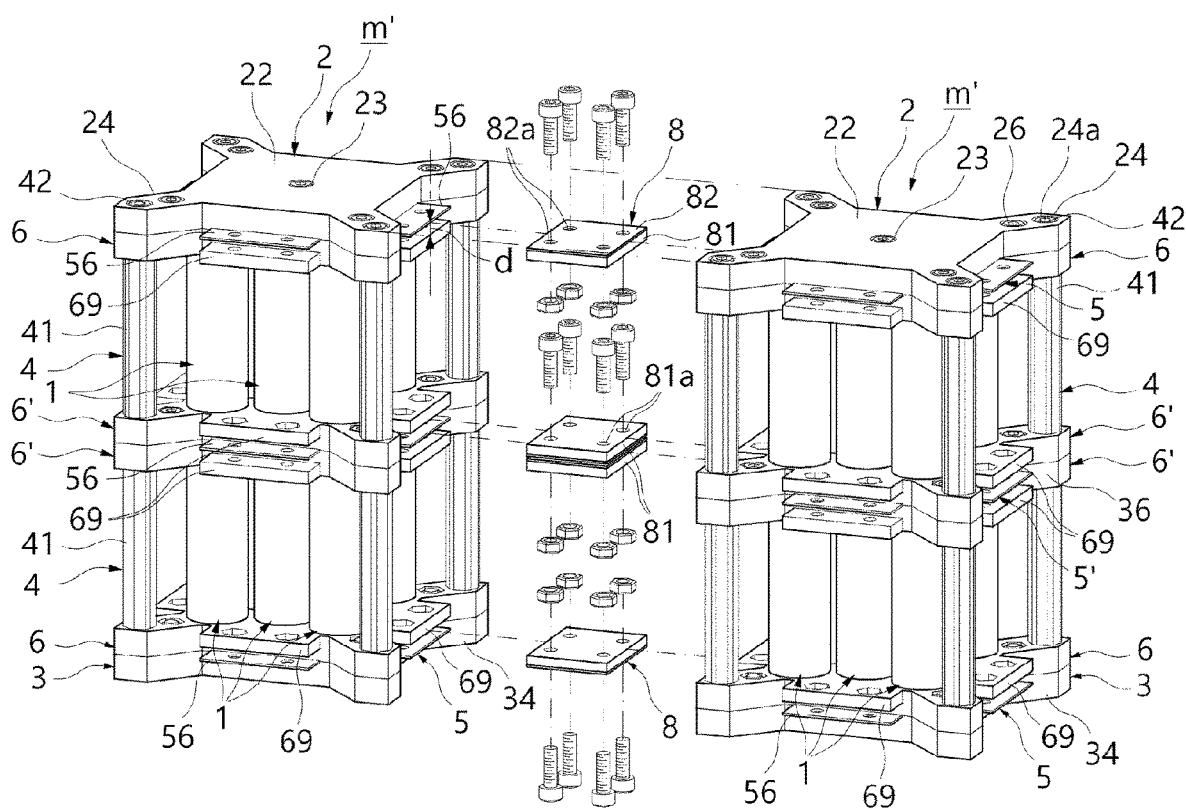
FIG. 13 is an exploded perspective view illustrating a disassembled state of a battery module assembly using the non-welding type battery module according to the second embodiment of the present invention.

FIG. 12 is a perspective view for describing the battery module assembly using the non-welding type battery module according to the first embodiment of the present invention, and FIG. 13 is an exploded perspective view illustrating a disassembled state of the battery module assembly using the non-welding type battery module according to the second embodiment of the present invention.

Referring to FIGS. 12 and 13, a battery module assembly s' using the non-welding type battery module according to the second embodiment of the present invention is one battery module assembly formed by arranging a plurality of non-welding type battery modules m' illustrated in the above-described second embodiment so as to be in contact with each other in a transverse direction and using the module coupling member 8 installed between adjacent non-welding type battery modules m'.

As shown in FIG. 12, the non-welding type battery module m' illustrated in the second embodiment is configured as the structure including the battery cell 1, the upper base plate 2, the lower base plate 3, the module fixing member 4, the bus bar member 5, and the battery cell support member 6, and has a structure in which the plurality of battery cells 1 are arranged in multiple layers in the longitudinal direction, and the battery cells 1 are disposed again in a plural number in the transverse direction, thereby implementing a battery module assembly having a larger capacity.

It should be understood that the above description is just one example for implementing the non-welding type battery module and the battery module assembly using the same according to the present invention, and the present invention is not limited to the above embodiments and a variety of modifications made by one of ordinary skill in the art without departing from the essential of the present invention are included in the scope of the claims of the present invention.

The terms used in the above-described embodiments are for the purpose of describing particular embodiments only and are not intended to be limiting to the present invention. As used herein, singular forms are intended to include plural forms as well, unless the context clearly indicates otherwise. In the present application, it will be further understood that the terms "comprise." "comprising," "include." and/or "including", when used in this specification, specify the presence of stated features, integers, steps, operations, elements, components and/or groups thereof but do not preclude the presence or addition of one or more other features, integers, steps, operations, elements, components and/or groups thereof.

The invention claimed is:

1. A non-welding type battery module comprising:
   a plurality of battery cells;
   an upper base plate disposed on an upper portion of the battery cells;
   a lower base plate disposed on a lower portion of the battery cells;
   a module fixing member coupled between the upper base plate and the lower base plate;
   a bus bar member seated on the upper base plate and the lower base plate and electrically connected to upper and lower electrode portions of the battery cells; and
   a battery cell support member disposed between the upper base plate and the lower base plate and configured to position the plurality of battery cells in place,
     wherein the bus bar member includes a plate-shaped conductive plate on which an electrode contact portion, to which a battery cell is electrically connected, and a connection portion, which has a terminal hole perforated therein, are defined,
     the electrode contact portion includes a plurality of upper deformation protrusions protruding upward from the plate-shaped conductive plate and a plurality of lower deformation protrusions protruding downward from the plate-shaped conductive plate while being in contact with the upper deformation protrusions,
     the battery cell support member includes a plate-shaped cell support plate, in which a cell seating hole perforated to allow the battery cell to be inserted therethrough and a support hole perforated to allow the module fixing member to be inserted therethrough are defined, and a connection protrusion which is disposed to be located below the connection portion and in which a module connection hole is perforated,
     the connection protrusion is configured to have a thickness less than a thickness of the plate-shaped cell support plate so that an insertion space is disposed between the connection portion and the connection protrusion, and
     each of the upper base plate and the lower base plate includes a plate-shaped body on which at least one coupling portion having a coupling hole perforated therein and a close contact protrusion protruding are defined.

2. The non-welding type battery module of claim 1, wherein
   the each of the upper base plate and the lower base plate includes the plate-shaped body on which the at least one coupling portion having the coupling hole perforated therein is defined, and
   the module fixing member is configured as a fastening member fastened to the coupling portion of the each of the upper base plate and the lower base plate.

3. The non-welding type battery module of claim 2, wherein
   the coupling portion protrudes from a corner portion of the plate-shaped body, and
   the fastening member includes a fastening rod, which has nuts embedded in an upper portion and a lower portion of an inner hole, and bolts fastened to the nuts.

4. The non-welding type battery module of claim 3, wherein at least one tool seating surface is defined on an outer surface of the fastening rod.

5. The non-welding type battery module of claim 1, wherein the battery cell support member includes the plate-shaped cell support plate, in which the cell seating hole perforated to allow the battery cell to be inserted therethrough and the support hole perforated to allow the module fixing member to be inserted therethrough are defined.

6. The non-welding type battery module of claim 1, wherein
   the battery cell support member includes the plate-shaped cell support plate, in which the cell seating hole perforated to allow the battery cell to be inserted therethrough, the support hole perforated to allow the module fixing member to be inserted therethrough, and an auxiliary coupling hole perforated for coupling between the upper base plate and the lower base plate or coupling between the battery cell support member and the upper and lower base plates are defined, and
   the each of the upper base plate and the lower base plate includes the plate-shaped body on which the at least one coupling portion having the coupling hole perforated therein and an auxiliary coupling hole perforated therein to correspond to the auxiliary coupling hole of the battery cell support member are defined.

7. The non-welding type battery module of claim 1, wherein the battery cells are supported by the battery cell support member, which is additionally disposed to define multiple layers in a longitudinal direction, and are electrically connected through the bus bar member disposed in contact with the battery cell support member.

8. A battery module assembly using a non-welding type battery module, the assembly comprising:
   the non-welding type battery module of claim 1, a plurality of which are disposed to be in contact with each other in a transverse direction; and
   a module coupling member coupled between adjacent non-welding type battery modules.

9. The assembly of claim 8, wherein the module coupling member is defined by a conductive member or in a structure in which a conductive layer is defined on a base layer to be electrically connected to the bus bar member.

10. A battery module assembly using a non-welding type battery module, the assembly comprising:
    the non-welding type battery module of claim 1, a plurality of which are disposed to be in contact with each other in a transverse direction; and
    a module coupling member coupled between adjacent non-welding type battery modules,
    wherein the module coupling member includes a module coupling plate is inserted into a space between the upper base plate and the bus bar member and a space between the lower base plate and the bus bar member, and has a coupling hole defined therein, and a module conductive member that is seated on a surface of the module coupling plate, is electrically connected to the bus bar member, and has a terminal hole perforated therein.

\* \* \* \* \*